Patented June 17, 1924.

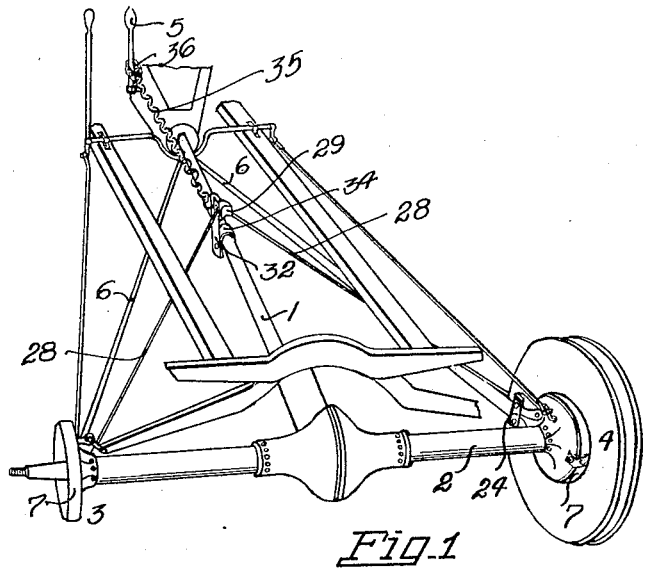
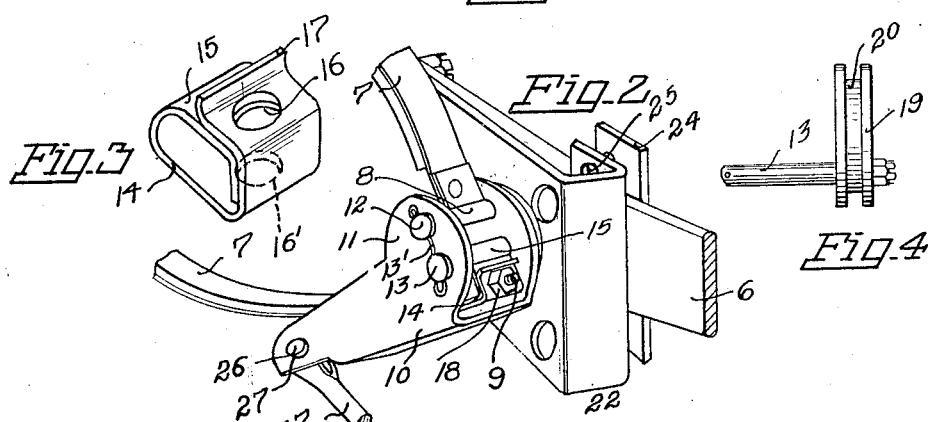
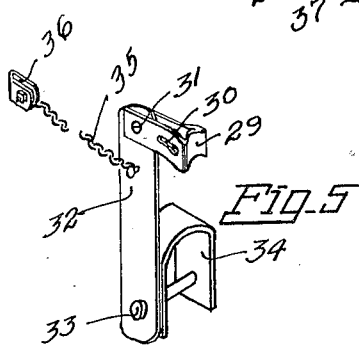
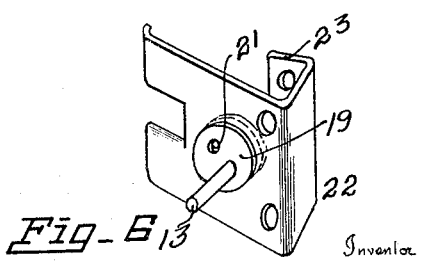

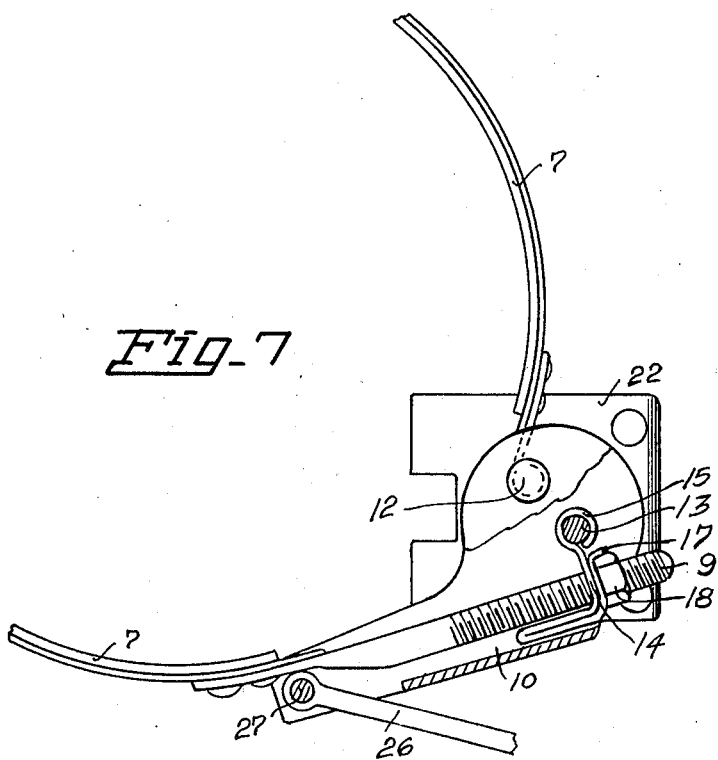

1,497,983

UNITED STATES PATENT OFFICE.

FREDERICK R. PETERSON, OF SPOKANE, WASHINGTON.

VEHICLE BRAKE.

Application filed June 25, 1923. Serial No. 647,555.

*To all whom it may concern:*

Be it known that I, FREDERICK R. PETERSON, a citizen of the United States, residing at Spokane, in Spokane County and State of Washington, have invented certain new and useful Improvements in Vehicle Brakes, of which the following is a specification.

The present invention relates to improvements in vehicle brakes which are adapted especially for use in connection with automobiles of the Ford type. The invention involves an attachment comprising operating mechanism and an external brake band in connection with the brake drum as now employed on existing automobiles, and of course is adapted for application to automobiles in the process of manufacture.

The parts of the device or mechanism are so constructed that they may be applied with facility and convenience, and by the utilization of my invention I provide braking means, for the rear wheels of the automobile, which are capable of use either in ordinary travel, or in case of an emergency to insure reliable control of the vehicle.

In the accompanying drawings I have illustrated one complete example of the physical embodiment of my invention wherein the parts are combined and arranged, in connection with the brake pedal of the automobile, according to one mode for the application of the principles of my invention, and it will be understood that other adaptations of the invention may be used, as for instance with the hand lever for the braking means of the automobile.

Figure 1 is a perspective view showing part of the chassis of a Ford automobile with the braking device of my invention applied thereto.

Figure 2 is an enlarged, detail view in perspective, showing the brake parts as applied to the exterior of a drum on a rear wheel.

Figure 3 is a perspective view of an angular attaching plate used at one end of the brake band.

Figure 4 is a detail view of an eccentric disk used in the application of the brake.

Figure 5 is a detail perspective view of the operating lever showing its means of attachment to the drive shaft casing of the automobile.

Figure 6 is a perspective view showing the eccentric disk in its bearing brackets.

Figure 7 is an enlarged detail view, in section, of the parts shown in Figure 2.

For convenience of locating the parts of the brake mechanism I have illustrated in Figure 1 of the drawings the main shaft casing 1 extending longitudinally of the automobile and the rear axle casing 2. At the ends of the axle, brake devices for the two wheels of the automobile are indicated as a whole by the numerals 3 and 4. The foot brake pedal 5 is of usual construction and the frame or chassis is indicated by the numeral 6. The brake devices 3 and 4 are of complementary construction and therefore a detailed description and illustration of one device will suffice for both.

The brake band 7 is of suitable construction and is designed for external application and frictional contact with the brake drum of the rear wheel, and the band is provided with an attaching clip 8 at one end and an attaching bolt 9 at its other end. These two ends are connected with the brake lever 10 which is made of sheet metal of proper strength and U-shaped in cross section, the two sides or side walls of the lever being fashioned as rounded heads 11. The heads of the lever are perforated for the reception of two bolts 12 and 13 to which the ends of the brake band are anchored, and a cotter pin or wire 13' passed through openings near the ends of the bolts hold the lever in position thereon. The bolt 12 passes through a sleeve on the clip 8 located between the two heads of the lever to provide a direct connection with the lever. The other end of the brake band is connected with its bolt 13 by means of a clevis 14 shown in Figure 3, which clevis has a sleeve 15 fitted around the bolt 13 and located between the heads of the lever. Holes 16 and 16' are provided in the clevis for the bolt 9 which forms a rigid extension of one end of the brake band, and a flange 17 on the plate is used as a lock for the nut 18 on the threaded end of the bolt 9, as seen in Figure 2. The ends of the brake band are thus pivoted on their respective bolts in the head of the brake lever, and the clevis 14 performs the function of maintaining the band bolt 9 in alinement when the brake is operated.

An eccentric disk 19 is rigidly fixed on the bolt 13 and is fashioned with an annular groove 20 and a bolt hole 21 for the bolt 12. The disk is supported in the bearing bracket 22, as best seen in Figure 6, which bracket is also fashioned of sheet metal, and is provided with an attaching flange 23 for co-action with a clamp plate 24 (Fig. 2). These two plates are bolted or clamped to a fixed part of the chassis or frame 6 as seen in Figure 2, where the bolts are indicated at 25, to form a support for the brake lever 10 and its connections.

The brake lever and the eccentric disk, through the two bolts 12 and 13, are thus supported in the bracket 22 which is rigidly fixed, and the eccentric disk is rotatable in the bracket as a bearing therefor, when the lever 10 is swung to apply the brake band to its drum. The disk forms the center for the swinging movement of the lever, and when the latter is pulled to the right in Figure 2 it will be apparent that the two ends of the brake band are pulled by the movement of the respective bolts 12 and 13 to clamp the brake band on the brake drum in the usual performance of its function.

Each braking device is provided with a pin as 26 which is pivoted at 27 to its brake lever, and a flexible connection in the form of a cable, cord or chain 28 has its ends attached to pin 26. The cable 28 is passed through an equalizing stirrup 29 having a slot or opening 30 for the cable, and at 31 the stirrup is pivoted at the upper end of an upright draw-lever 32. The draw lever is pivoted to oscillate on a bolt 33 and the bolt is used to clamp a U-shape shackle 34 to the main shaft casing 1.

The draw lever 32 is thus located centrally of the automobile toward the front and the flexible connection or cable reaches therefrom to the rear wheels of the vehicle as indicated in Fig. 1. Near the upper end of the draw lever a draw chain or actuating cable or other suitable connection 35 is connected and this member extends forwardly of the vehicle to the brake pedal 5 and is connected with said pedal by the clevis 36 thereon.

Thus it will be apparent that when the pedal is depressed or swung on its pivot in usual manner the brake bands for both rear wheels will be applied frictionally to their respective brake drums.

To facilitate the movement of the cable 28 a slide or a pulley may be used in the slot 30 of the stirrup 29. The parts of the mechanism are, so far as possible, made up from band or sheet metal, punched and pressed into proper shape to suit the requirements, thus reducing the cost of production, and the parts are designed with the view or purpose of facility in attaching and assembling them in their operative positions. Because of this facility in assembling and attaching the parts the expense of labor is also reduced, while at the same time a reliable and durable brake operating mechanism is insured.

If it is desirable to hook up my brake with the hand lever common to most cars it is only necessary to make connection of the usual or original brake rods 37 supplied with the car to the pin 26. In this way it is left optional whether foot or hand lever connection be made. When foot lever is used the connection is made through the use of the cable and its appurtenances and when the hand lever is used the connection rods 37 are utilized.

Having thus fully described my invention, what I claim as new and desire to secure by Letters Patent is:—

1. The combination with a supporting bracket of a rotatable disk supported therein and a pair of diametrically arranged bolts on said disk, a brake lever supported on said bolts, a brake band having its ends connected with said bolts, and means for operating said lever.

2. The combination with a supporting bracket of a disk having an annular groove and rotatably supported in said bracket, a pair of diametrically disposed bolts on said disk, a brake lever having spaced heads supported on said bolts and means for operating said lever, and a brake band having its ends located between said heads and operatively connected with said bolts.

3. The combination with a supporting bracket and a disk rotatable therein, of spaced bolts in said disk, a brake band having one end pivoted on a bolt, a clevis pivoted on the other bolt, a bolt forming an extension of the other end of said band and passed through said clevis, a securing nut for the last named bolt, and a brake lever supported on said spaced bolts.

In testimony whereof I affix my signature.

FREDERICK R. PETERSON.